United States Patent [19]
Nishitani

[11] Patent Number: 5,243,146
[45] Date of Patent: Sep. 7, 1993

[54] ELECTROMAGNETIC-TYPE LOAD WEIGHING APPARATUS

[75] Inventor: Katsuo Nishitani, Shizuoka, Japan

[73] Assignee: Yazaki Corporation, Japan

[21] Appl. No.: 826,976

[22] Filed: Jan. 28, 1992

[30] Foreign Application Priority Data

Jan. 29, 1991 [JP] Japan .................. 3-2468[U]

[51] Int. Cl.⁵ .................. G01G 19/08; G01G 3/14
[52] U.S. Cl. .................. 177/136; 177/139; 177/210 R; 177/210 EM; 177/211
[58] Field of Search .................. 177/136, 139, 210 R, 177/210 EM, 211

[56] References Cited

U.S. PATENT DOCUMENTS

| | | | |
|---|---|---|---|
| 3,172,492 | 3/1965 | Sobotka et al. | 177/136 |
| 3,531,766 | 9/1970 | Henzel | 177/136 |
| 4,287,958 | 9/1981 | Schmidt | 177/136 |
| 4,812,806 | 3/1989 | Freeman | 177/136 X |
| 4,969,529 | 11/1990 | Reichow | 177/136 |

FOREIGN PATENT DOCUMENTS

| | | |
|---|---|---|
| 47-40835 | 10/1972 | Japan . |
| 60-23687 | 7/1985 | Japan . |
| 61-14333 | 1/1986 | Japan . |
| 61-14435 | 9/1986 | Japan . |
| 62-274223 | 11/1987 | Japan . |

*Primary Examiner*—Benjamin R. Fuller
*Assistant Examiner*—Randy W. Gibson
*Attorney, Agent, or Firm*—Wigman, Cohen, Leitner & Myers

[57] ABSTRACT

A load weighing apparatus for weighing a weight of a load on a vehicle comprises an intervening element provided between a body frame and a suspension for transmitting the weight of the load to the suspension from the body frame. The intervening element is formed of a magnetic material and has a plurality of bore sections. An excitation winding is wound about the intervening element through ones of the bore sections, while a measurement winding is wound about the intervening element through the remaining bore sections. An electric power source for applying voltage is connected to the excitation winding. A measuring unit for measuring voltage across the measurement winding is connected thereto.

5 Claims, 5 Drawing Sheets

ELECTROMAGNETIC-TYPE LOAD WEIGHING APPARATUS

BACKGROUND OF THE INVENTION

The present invention relates to a load weighing apparatus mounted on a vehicle such as a lorry or a truck or the like, for weighing a weight of a load.

Various apparatuses have been proposed as a weighing apparatus of the kind referred to above. A representative one of the apparatuses will be described hereunder.

(1) A weighing apparatus disclosed in Japanese Utility Model Publication No. 60-23687 comprises a pair of strain detectors of magneto-striction type which are mounted respectively on an upper surface and a lower surface of an axle, for detecting a compressive force on the upper surface and a tensile force on the lower surface, respectively, due to flexure of the axle. Detecting values of the compressive and tensile forces are added to each other to detect flexure of the axle without occurring of errors due to a change in temperature.

(2) A weighing apparatus disclosed in Japanese Utility Model Laid-Open No. 61-144435 comprises a load meter which is composed of a display element to which a mark indicating propriety or suitability of a load is applied, and an indicating element fixedly mounted on a body frame and which is movable along the mark on the display element in accordance with deflection of a suspension spring to indicate suitability of the load.

(3) A weighing apparatus disclosed in Japanese Patent Laid-Open No. 62-274223 disclosed that, in a vehicle such as a wheel loader or the like in which a load carrying section is movable vertically by a hydraulic cylinder, hydraulic pressures of the hydraulic cylinder before and after the load carrying section reaches a predetermined height position are sampled at predetermined time intervals and predetermined frequency numbers. A mean value of hydraulic data of these sampled hydraulic pressures is computed. The weight of the load on the load carrying section is equivalent to the hydraulic mean value.

(4) A weighing apparatus disclosed in Japanese Utility Model Laid-Open No. 61-14333 comprises a strain sensor which is mounted on a body frame. Flexure of the body frame at the time a load on a load-carrying platform is loaded and unloaded is correlated to that load. Thus, monitoring of the loading in view of a loading limit with respect to the vehicle is made possible.

Of the proposals disclosed respectively in the above-described publications, (1) is difficult implement in practical use because the measured values vary due to the permanent strain or flexure of the axle and due to material hysteresis. Further, (2) is also difficult to implement in practical use, because displacement hysteresis is large due to the fact that a characteristic of a spring displacement with respect to the load of the spring is different for every vehicle. Furthermore, (3) is applicable only to a vehicle such as a wheel loader having a hydraulic cylinder and is unsuitable for those vehicles not having a hydraulic cylinder. Moreover, (4) is impossible into practical use in measurement, because of permanent strain and hysteresis of the material of the body frame.

SUMMARY OF THE INVENTION

It is therefore an object of the invention to provide a load weighing apparatus capable of weighing weight of a load on a vehicle with high accuracy and with high reliability.

According to the invention, there is provided a load weighing apparatus for weighing a weight of a load on a vehicle, the apparatus comprising:

an intervening element provided between a body frame and a suspension for transmitting the weight of the load to the suspension from the body frame, the intervening element being formed of a magnetic material and having a plurality of bore sections;

an excitation winding wound about the intervening element through ones of the bore sections; and a measurement winding wound about the intervening element through the remaining bore sections.

With the arrangement of the invention, it is possible to weigh the weight of the load with high accuracy, without being influenced by hysteresis and permanent strain of the axle and the vehicle body.

DETAILED DESCRIPTION OF THE PREFERRED EMBODIMENTS

Figure 1:
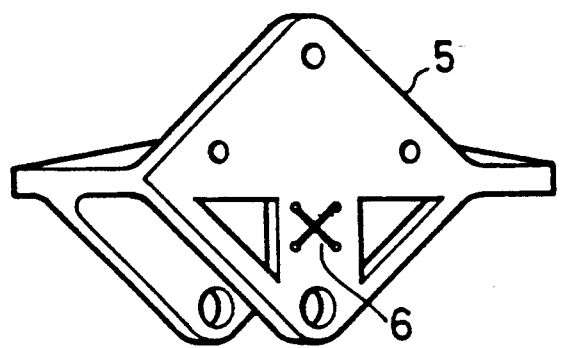
FIG. 1 is a perspective view showing an arrangement of a bracket according to an embodiment of the invention.
Figure 2:
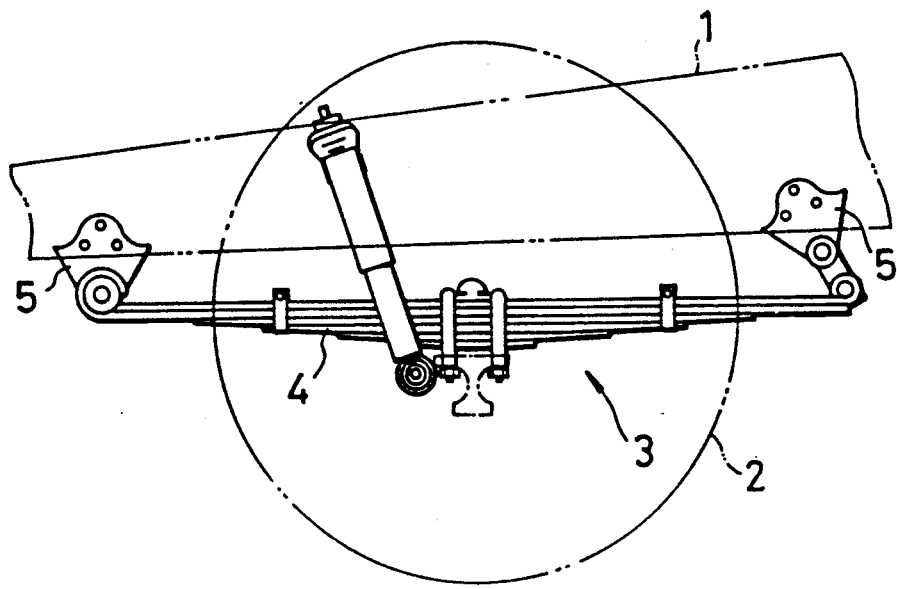
FIG. 2 is a view for explanation showing an arrangement of a front suspension for a vehicle or car to which the embodiment of the invention is applied.
Figure 3:
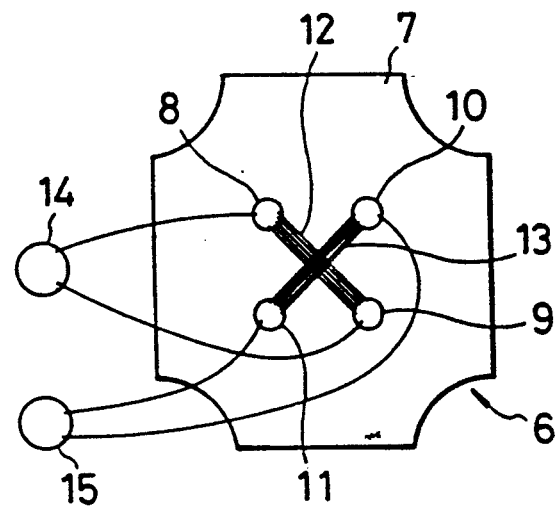
FIG. 3 is a view for explanation showing an arrangement of a transducer which is provided on the bracket.

Referring first to FIGS. 1 through 3, there is shown a first embodiment of the invention. As shown in FIG. 2, a body frame 1 is provided with a front suspension 3 for transmitting weight of a load from the body frame 1 to wheels 2. A spring 4, which constitutes the suspension 3, has both ends which are mounted on the body frame 1 through a pair of brackets 5 which are transmitting elements.

Each of the brackets 5 is formed of a magnetic material, and is provided with a transducer 6 which is magnetic resilient or elastic transducing means as shown in FIG. 1. The transducer 6 is disclosed in Japanese Patent Publication No. 47-40835. As shown in FIG. 3, the transducer 6 is arranged such that four (4) bore sections 8, 9, 10 and 11 are formed within a magnetic core 7 in directions extending perpendicularly to each other. Further, an excitation winding 12 is wound between the bore sections 8 and 9, and a measurement winding 13 is wound between the bore sections 10 and 11. The excitation winding 12 is connected to an A.C. (alternating current) electric power source 14 for applying voltage thereto, and the measurement winding 13 is connected to a measuring unit 15 for measuring voltage therebetween. The excitation winding 12 and the measurement winding 13 are wound in their respective directions extending perpendicularly to each other.

Figure 4:
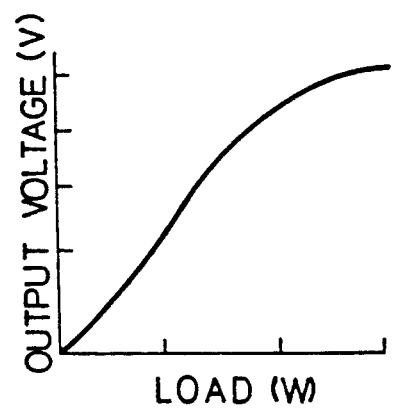
FIG. 4 is a diagram showing a relationship between output voltage and a load acting upon the transducer.

In the arrangement described above, current flowing through the excitation winding 12 generates magnetic fluxes around the bore sections 8 through 11 in the magnetic core 7. When the magnetic core 7 is not subjected to influence of a mechanical force, the magnetic fluxes within an area around the bore sections 8 through 11 and within an area between the bore sections are symmetrical with each other, so that no voltage is induced on the measurement winding 13. When the magnetic core 7 is subjected to the mechanical force, the magnetic fluxes are deformed so that voltage is induced on the measurement winding 13. The voltage is read by the measuring unit 15. At this time, the transducer 6 measures only a vertical stress. A relationship between a load W and output voltage V of the transducer 6 due to the stress is illustrated in FIG. 4.

According to the embodiment, the brackets 5 are formed of a magnetic material, and the transducers 6 are provided integrally on the brackets 5, respectively. Accordingly, it is possible to measure or weigh the weight of the load with high reliability and with high accuracy. As a result, an accident due to over loading and a damage or breakage of a road surface can be prevented from occurring, making it possible to lighten a burden of a driver of a vehicle.

Figure 5:
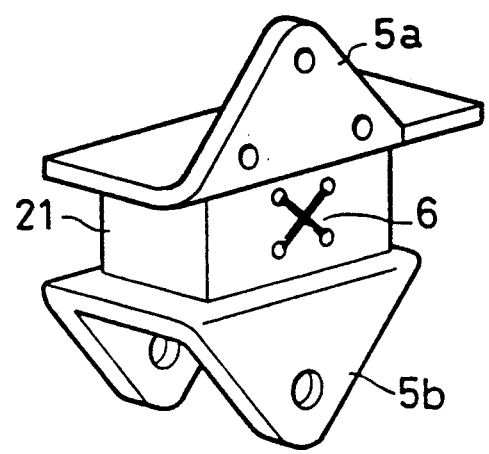
FIG. 5 is a perspective view showing an arrangement of a bracket according to another embodiment of the invention.

In the above-described embodiment, a case has been explained where each transducer 6 is provided integrally on a corresponding one of the brackets 5. As shown in FIG. 5, however, the arrangement may be such that the bracket 5 is divided into a pair of upper and lower bracket sections 5a and 5b, and a detecting section 21 formed of a magnetic material, on which the transducer 6 is provided integrally, is provided between the pair of upper and lower bracket sections 5a and 5b.

Figure 6:
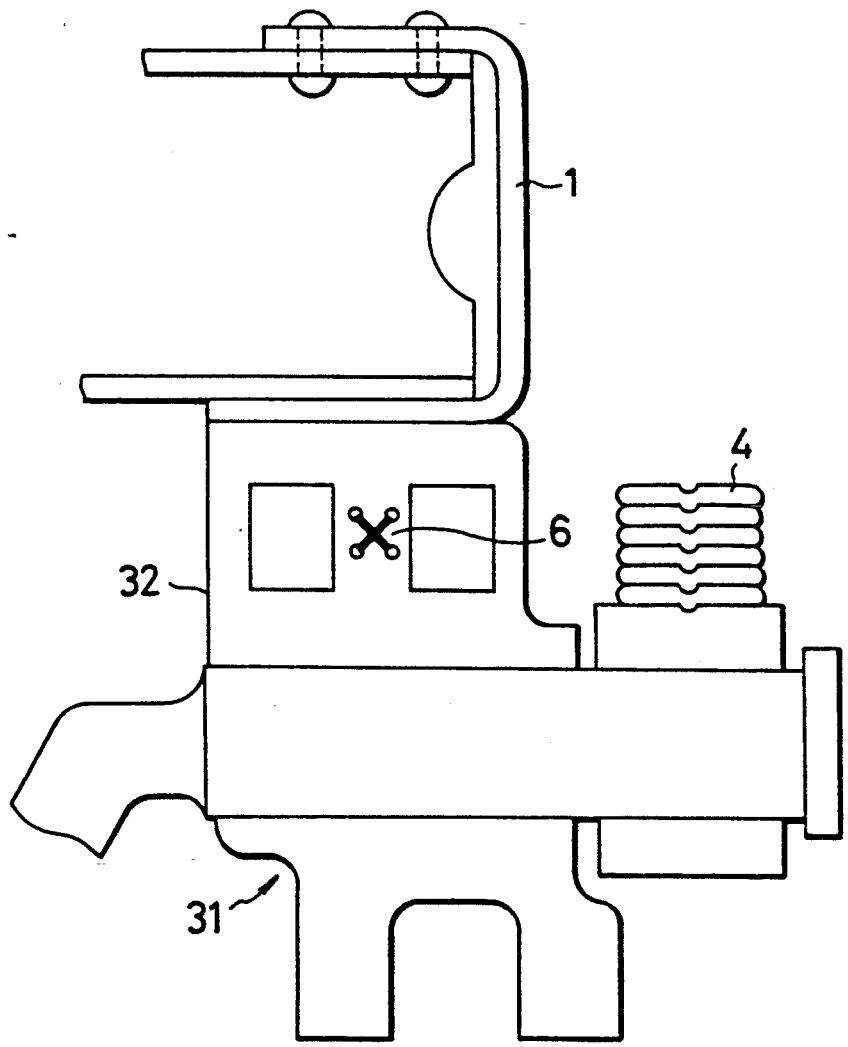
FIG. 6 is a view for explanation showing an arrangement in the case where a bracket according to an embodiment of the invention is provided on a rear suspension of the vehicle.

Moreover, as shown in FIG. 6, the arrangement may be such that a bracket 32 forming a rear suspension 31 is formed of a magnetic material similarly to a case of the front suspension 3, and the transducer 6 is provided integrally or in division.

Furthermore, the arrangement may also be such that a pair of transducers 6 are provided respectively on the brackets 5 and 32 of the respective front suspension 3 and rear suspension 31, loads detected respectively by the transducers 6 are synthesized with each other, and the composition or synthesis is displayed or recorded by the measuring unit 15.

Figure 7:
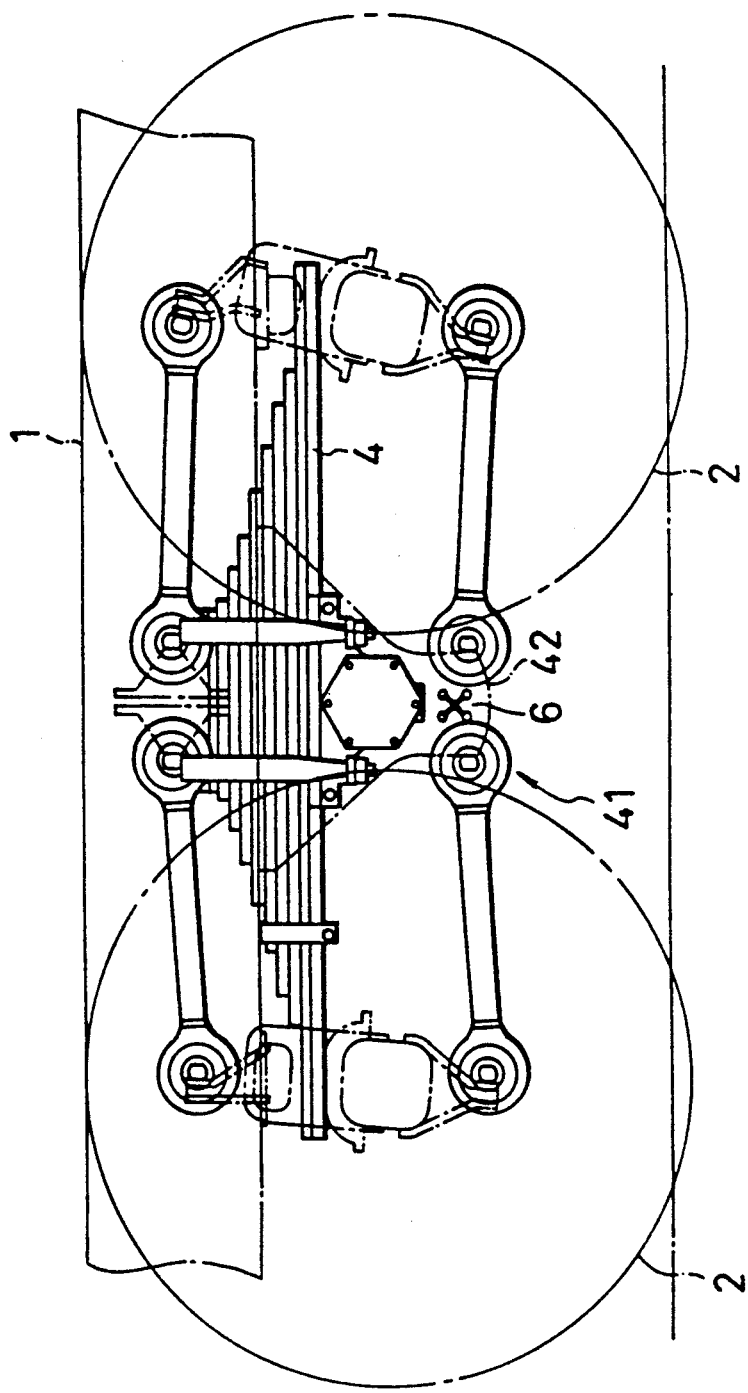
FIG. 7 is a view for explanation showing an arrangement of a trunnion suspension to which an embodiment of the invention is applied.
Figure 8:
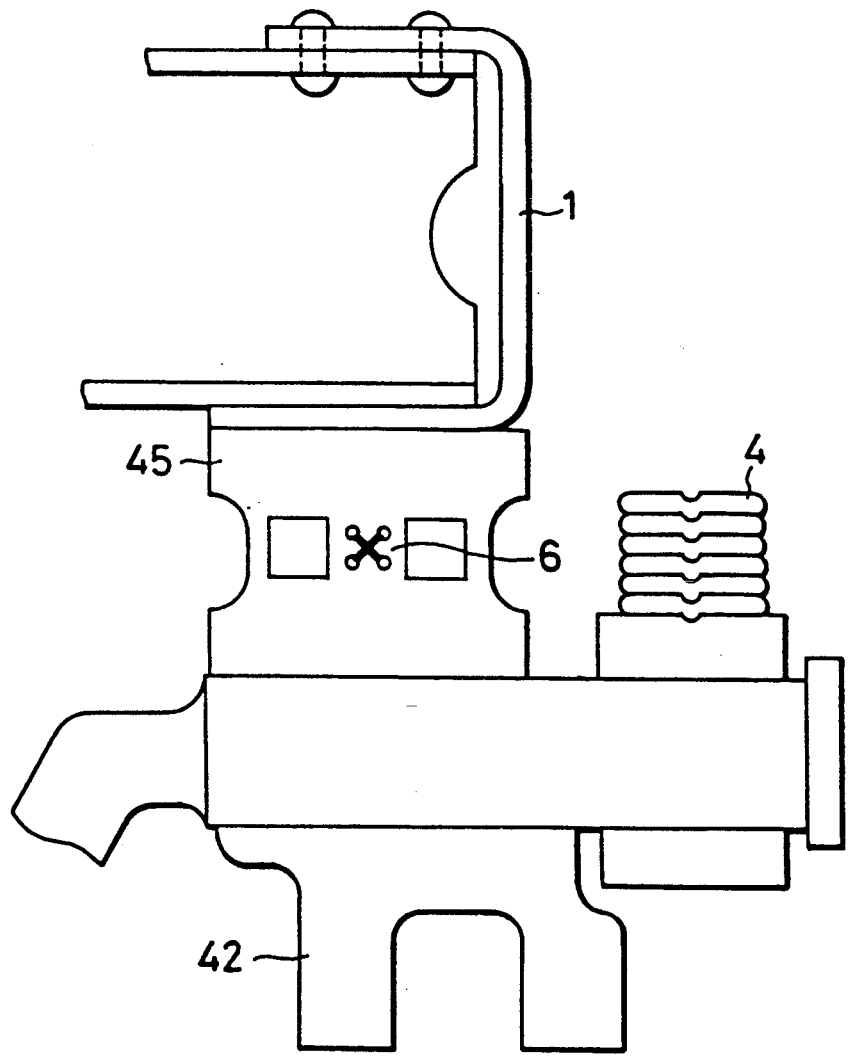
FIG. 8 is a view for explanation showing the arrangement of the trunnion suspension illustrated in FIG. 7, to which the embodiment of the invention is applied.

Further, as shown in FIG. 7, the transducer 6 may be provided on a bracket 42 of a trunnion suspension 41. In this case, as shown in FIG. 8, a detecting section 43 having the transducer 6 at a location between the body frame 1 and the trunnion bracket 42 may be provided in division.

What is claimed is:

1. A load weighing apparatus for weighing a load weight on a vehicle, said apparatus comprising:
   an intervening element provided between a vehicle body frame and a suspension attached to an axle for transmitting the weight of the load to said suspension from said body frame, said intervening element being formed of a magnetic material and having a plurality of bore sections;
   an excitation winding wound about said intervening element through one of said bore sections;
   a measurement winding wound about said intervening element through another one of said bore sections and producing a voltage through a change in permeability of said intervening element when a load is applied to said intervening element from the body frame and the suspension; and
   an electric power source for applying voltage to said excitation winding;
   wherein said excitation winding and said measurement winding are wound in directions extending perpendicularly to each other.

2. A load weighing apparatus according to claim 1, further including a measuring unit for measuring voltage across said measurement winding.

3. A load weighing apparatus according to claim 1, wherein said intervening element is integrally formed with a bracket of said suspension.

4. A load weighing apparatus according to claim 1, wherein said intervening element is supported between at least a pair of bracket elements.

5. A load weighing apparatus for weighing a load weight on a vehicle, said apparatus comprising:
   a first intervening element provided between a vehicle body frame and a front suspension attached to a front axle and a second intervening element provided between said body frame and a rear suspension attached to a rear axle, respectively, for transmitting the weight of the load to said front and rear suspensions from said body frame, each of said intervening elements being formed of a magnetic material and having a plurality of bore sections;
   an excitation winding wound about each of said intervening elements through each respective bore section;
   a measurement winding wound about each of said intervening elements through each respective remaining bore section, and producing a voltage through a change in permeability of said intervening elements when a load is applied to said intervening elements from the body frame and the suspension;
   an electric power source for applying voltage to said excitation windings; and
   a measuring unit for measuring voltage across said measurement windings and synthesizing the measured voltage;
   wherein said excitation windings and said measurement windings are wound in directions extending perpendicular to each other.

* * * * *